United States Patent [19]

Augustin, Jr. et al.

[11] 4,023,191

[45] May 10, 1977

[54] CAMERA BACK APPARATUS

[75] Inventors: Rolf M. Augustin, Jr., Wellesley; Norman W. Cutler, Jr., Braintree, both of Mass.

[73] Assignee: Polaroid Corporation, Cambridge, Mass.

[22] Filed: Nov. 4, 1975

[21] Appl. No.: 628,486

[52] U.S. Cl. ............................................. 354/86
[51] Int. Cl.$^2$ .................................... G03B 17/50
[58] Field of Search ................. 354/83, 84, 85, 86, 354/275

[56] References Cited

UNITED STATES PATENTS

| 2,496,630 | 2/1950 | Land ................................... 354/86 |
| 3,350,990 | 11/1967 | Finelli ................................. 354/86 |
| 3,852,780 | 12/1974 | Augustin ............................ 354/86 |

*Primary Examiner*—Monroe H. Hayes
*Attorney, Agent, or Firm*—Edward S. Roman; John S. Vale

[57] ABSTRACT

This invention relates to a camera back for selective releasable attachment to a front camera body comprising two generally flat housings in end to end pivotal connection with respect to each other wherein the first of the housings is adapted to slidably accept a plurality of stacked film units of the self-developing type therein in a manner whereby the photosensitive surface of the forwardmost film unit is positioned at an exposure window corresponding with the focal plane of the front camera body when the camera back is releasably attached to the front camera body. The second housing defines an imbibing chamber for receipt therein of exposed film units in a light tight environment. One open end of the imbibing chamber includes a pair of processing rollers thereacross in operative association with other film advancing mechanisms which sequentially advance exposed film units from their position at their exposure window of the first housing into the imbibing chamber of the second housing. Automatic drive means are provided by a motor conveniently spaced in a portion of the first housing spaced laterally apart from the processing rollers in noninterfering relationship with the path of advancement of the exposed film units through the processing rollers into the imbibing chamber. In addition, there may be provided an adapter in releasable, light tight connection with respect to the camera back and extending above at least a part of the motor housing portion to accommodate releasable, light tight connection to the front camera body, such that the exposure window of the camera back aligns in substantial coincidence with respect to the focal plane of the front camera body.

29 Claims, 11 Drawing Figures

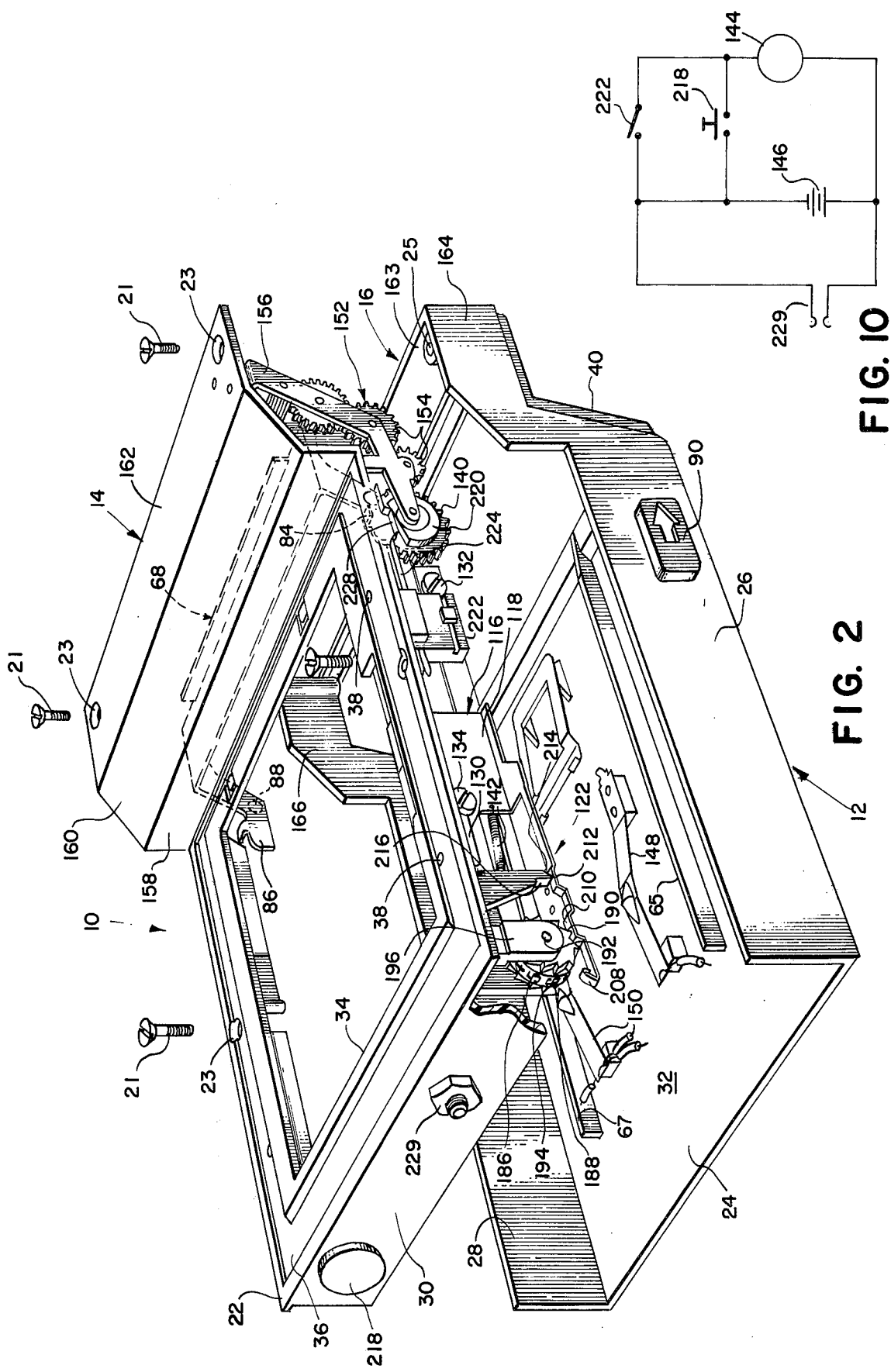

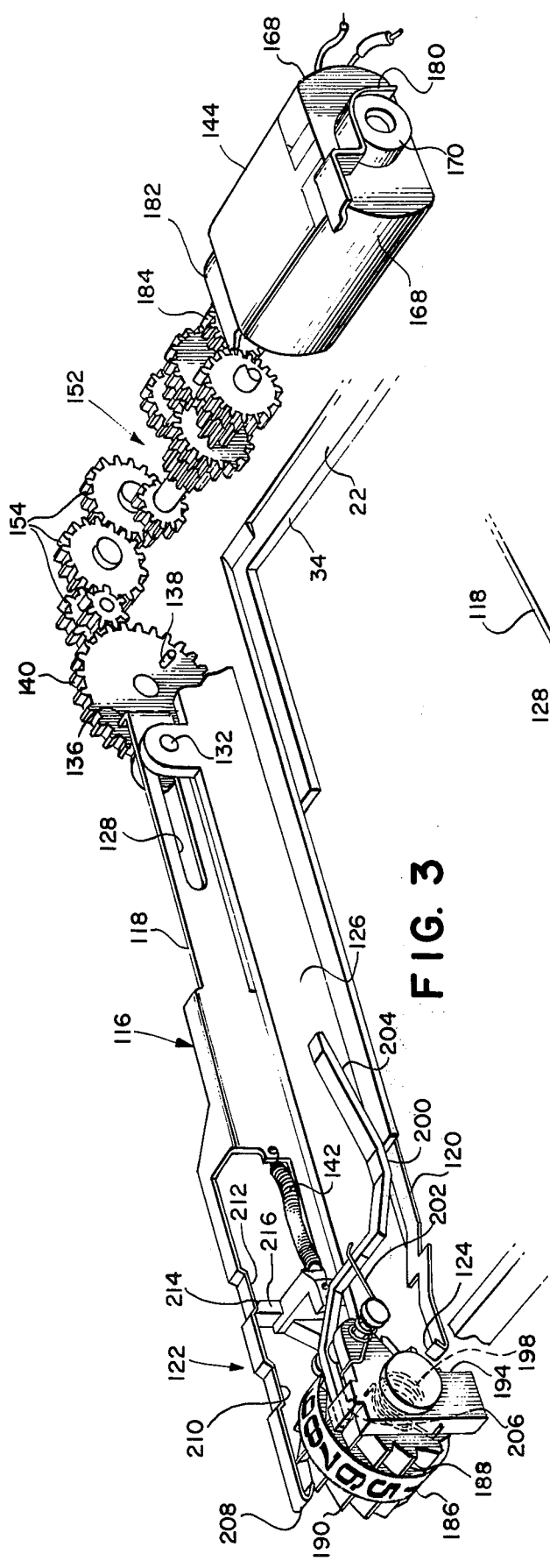
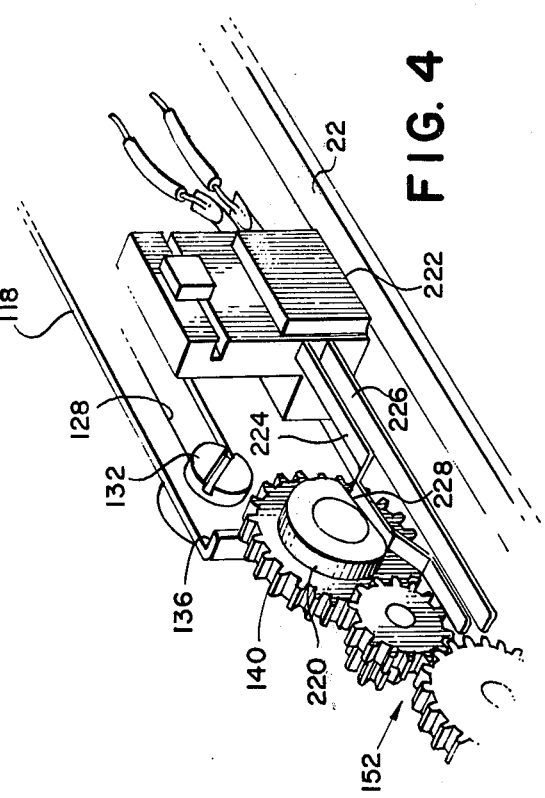

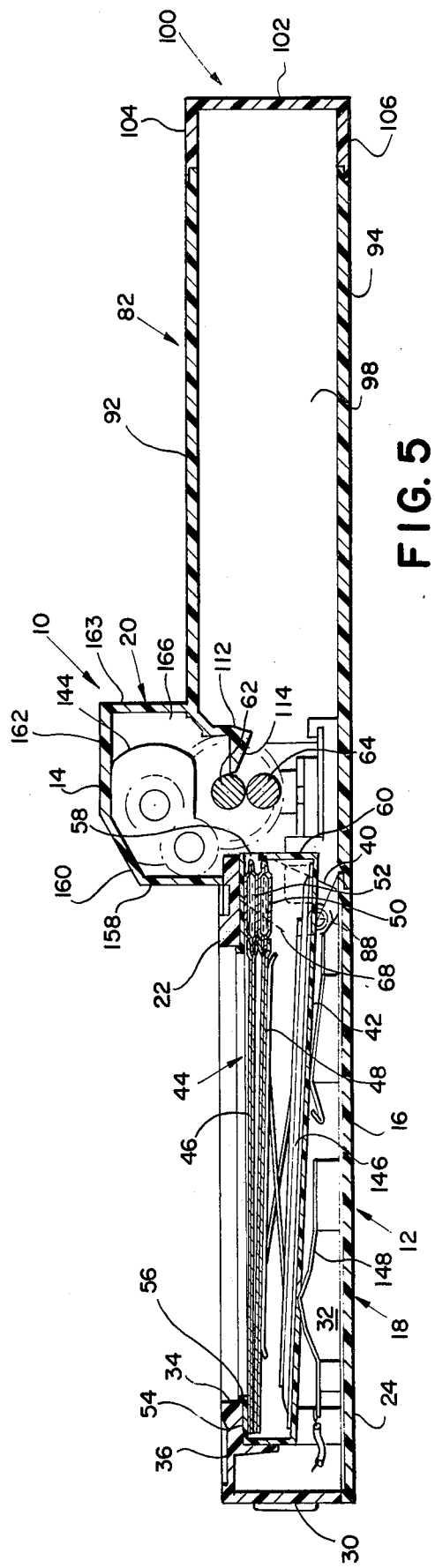

CAMERA BACK APPARATUS

BACKGROUND OF THE INVENTION

This invention relates generally to a camera back for selective attachment to a front camera body and more particularly to a motorized camera back for use with self-developing type film units which may be advanced and processed from the camera back subsequent to their exposure from a front camera body releasably connected to the camera back.

Camera backs of the type having structure for both exposing and processing self-developing film units are well known in the art, and may be mounted on the back of a conventional camera utilizing complementary mounting structure and the exposure components of the camera. When thus mounted, as for example, in a manner of a standard film holder on a 4 by 5 press review camera, the camera back serves to slidably accept a photographic film unit so as to position a photosensitive surface at the focal plane of the camera for exposure. Furthermore, it will permit withdrawal or advancement of the film unit between compressive processing members to facilitate development of the exposed film by the diffusion transfer process. The demand for self-developing film for use in certain cameras is large enough that specialized accessory packs have been developed that are directly connectable to cameras having backs such as the Graflok back on the Speed Graphic camera.

One such patent for a camera back, as described in U.S. Pat. No. 3,505,943 by A. H. Bellows, issued Apr. 14, 1970, discloses a motor driven pressure roll mechanism for use with camera backs of the above-described type where the principal components of a small DC electric drive motor are housed within one cylindrical pressure roll, the diameter of which is maintained at a minimum. Most recently, it has been proposed that such camera backs be utilized in conjunction with self-developing film units of the transparency type which require a sufficient imbibing time in a light tight environment subsequent to their advancement through a pair of pressure applying rollers.

Therefore, it is a primary object of this invention to provide a camera back of simple and economical construction for use with self-developing type film units.

It is also an object of this invention to provide a camera back for use with self-developing film units of the transparancy type wherein a light tight imbibing chamber is provided to receive the film units subsequent to their advancement through pressure applying means.

It is another object of this invention to provide a camera back for use with self-developing film units together with an adapter to accommodate connection of the camera back to a great many standard camera configurations less frequently, or only occasionally, used with self-developing type film. It is an even further object of this invention to provide a motorized camera back for use with self-developing type film units where the motor is conveniently spaced in noninterfering relation with respect to the processing members together with an adapter for facilitating connection to the front camera body.

Other objects of the invention will in part be obvious and will in part appear hereinafter.

SUMMARY OF THE INVENTION

The present invention relates to a camera back for selective attachment to a front camera body. The camera back comprises a first housing including first and second fixedly connected sections, the first section of which includes a substantially planar forward wall having an exposure aperture therethrough and including a marginal section comprising tactile discontinuities on its forward face extending around the exposure window configured to facilitate a releasable light seal connection of the camera back to the front camera body. The first section additionally includes a substantially planar rear wall spaced a substantially short distance from the forward wall in parallel relationship thereto by a pair of parallel side walls and an end wall. The first section defines a chamber having an open end opposite the end wall through which the film cassette, including a plurality of unexposed film units of the self-developing type stacked in an array, may be inserted therein. The second section includes a plurality of walls, and extneds outwardly from the forward wall of the first section in the direction away from its rear wall and also extends a predetermined distance in front of an open end of the first housing in the direction away from the first housing end wall. The second section is also disposed entirely on the opposite side of the marginal portion from the end wall so as not to extend over the marginal portion.

Means are included within the first housing section for locating the cassette within the chamber with its stacked array of unexposed film units aligned with the exposure window. An actuable film advance mechanism is also disposed within the first housing for selectively initiating the advancement of a film unit after its exposure from the cassette in the direction of the first housing's open end.

There is also included a substantially flat second housing pivotally connected to the first housing for displacement between a first position wherein the second housing precludes the insertion of the film cassette into, or its removal from, the chamber and a second position wherein access is available to the open end of the chamber for purposes of inserting and removing the film cassette from the chamber. The second housing includes substantially planar forward and rear walls spaced a substantially short distance apart by a pair of parallel side walls and an end wall defined when the second housing is disposed in its first position, a chamber having an open end facing the first housing's open end and substantially constituting extensions of the first housing's rear and side walls. The second housing's chamber extends a sufficient length in the direction away from its open end to receive and store the film units after their exposure within the first housing. The short distance that the second housing's forward wall is spaced from its rear wall and the predetermined distance the first housing's second section extends in front of its open end serves, when the second housing is in its first position, to locate a portion of the first housing's second section above a portion of the second housing with the first housing's second section extending only a relatively short distance along the second housing in the direction of the second housing's end wall.

A pair of juxtaposed processing rollers are connected to the second housing adjacent its open end for movement therewith to be located to receive therebetween a leading edge of an exposed film unit when the second housing is in its first position and as the exposed film unit is advanced by the film advance mechanism from the cassette. There is also included a motor positioned within the second section of the first housing so as not to interfere with the open end of the first housing's chamber. Means are included within the first housing for coupling the motor to the film advance mechanism and additional means are provided for automatically connecting at least one of the processing rollers to the coupling means when the second housing is displaced into its first position from its second position. Thus, when the motor is energized, the rollers cooperate with the film advance mechanism to advance the exposed film unit from the first housing and deposit the exposed and processed film unit in the second housing. Complementary means respectively formed on peripheral edges of appropriate ones of the walls of the first and second sections of the first housing and on peripheral edges of appropriate ones of the walls of the second housing effect a light tight mating arrangement between the first and second housings when the second housing is disposed in its first position and the camera back is connected to the front camera body. At such a time, the first and second housing sections serve to define a first chamber sealed from ambient light in which the film units can be retained prior to and during their exposure and a second chamber sealed from ambient light in which the film units may be stored following their exposure.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment or when read in connection with the accompanying drawings or when like members have been employed in the different figures to note the same parts and wherein:

FIG. 2 is an exploded perspective view of a portion of the camera back of FIG. 1;

FIG. 3 is an enlarged fragmented perspective view of a portion of the camera back of FIG. 1;

FIG. 4 is an enlarged fragmented perspective view of another portion of the camera back of FIG. 1;

FIG. 5 is a cross sectional side view of the camera back of FIG. 1;

FIG. 6 is an enlarged fragmented perspective view of still another portion of the camera back of FIG. 1;

FIG. 10 is an electrical schematic diagram for a circuit embodied in the camera back of FIG. 1.

DESCRIPTION OF THE PREFERRED EMBODIMENT

Figure 1:
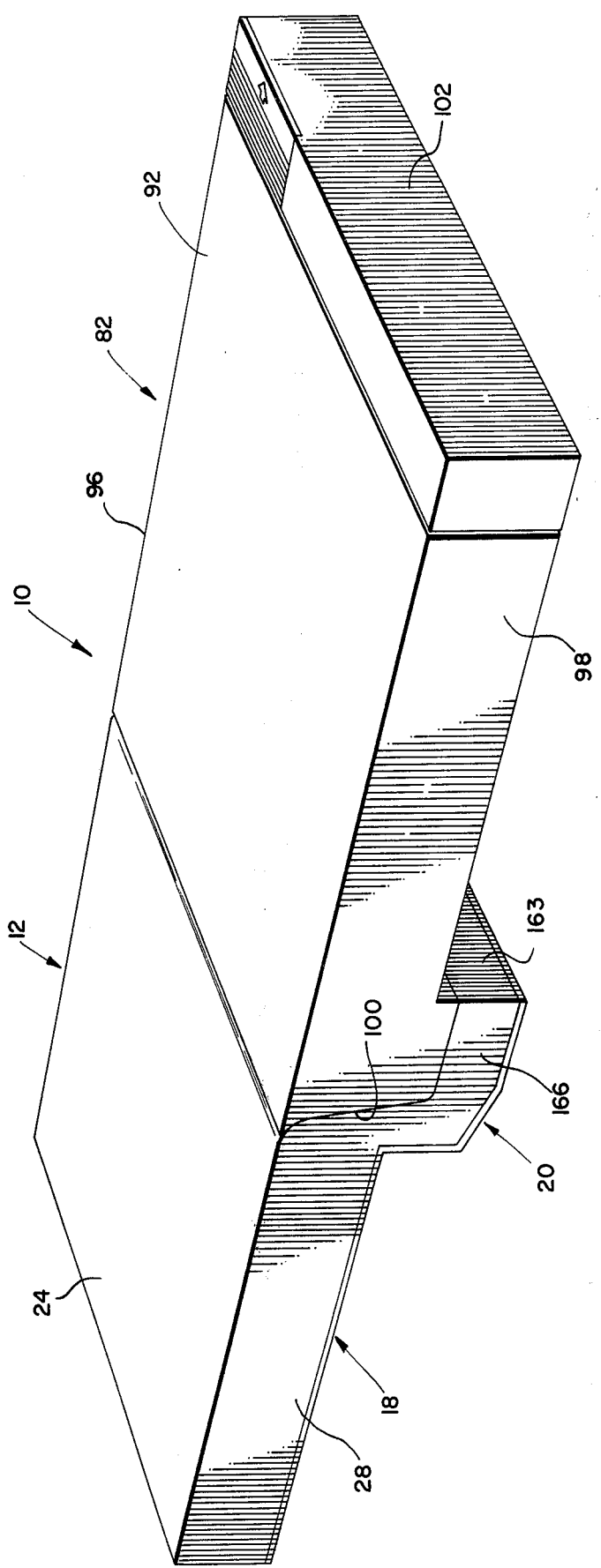
FIG. 1 is a perspective view of the camera back of this invention.
Figure 7:
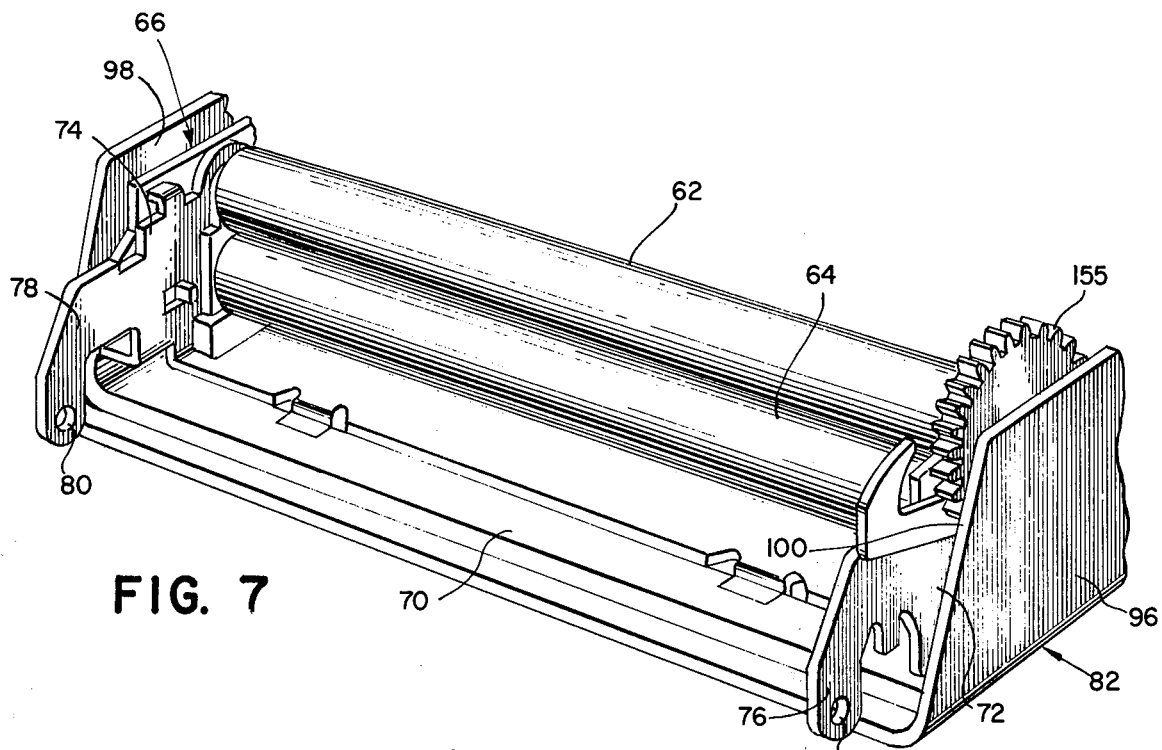
FIG. 7 is an enlarged fragmented perspective view of yet another portion of the camera back of FIG. 1.

Referring now to FIGS. 1, 2, 5, and 9, there is shown generally at 10 a camera back apparatus of the type adapted for holding and processing film units of the self-developing type. The camera back 10 may be adapted for use in a manner to be subsequently described with a front camera body apparatus as shown generally at 11. The camera back 10 includes a first housing 12 comprising two thin walled, molded, body elements 14 and 16 having complementary edge portions with respect to each other to accommodate their connection in light tight sealing engagement. Body elements 14 and 16 may be conveniently connected by a plurality of screws 21 extending respectively through a plurality of peripherally spaced apart holes 23 in body element 14 and threadably engaged to a plurality of corresponding female screw receiving holes 25 integrally molded with body element 16. When connected in light sealing relation with respect to each other, the molded body elements 14 and 16 collectively define two housing sections as shown generally at 18 and 20. Housing section 18 includes forward and rearward substantially planar major wall elements 22 and 24 spaced a substantially short distance apart in substantially parallel relation with respect to each other by two spaced apart substantially planar and parallel side wall elements 26 and 28 connecting respective longitudinal edge portions of the forward and rearward wall elements 22 and 24. An end wall element 30 connects respective edge portions of the forward, rearward and side wall elements to define an open ended film receiving chamber 32 therein. The forward wall element 22 includes an exposure window 34 therethrough together with a marginal section around the window which may comprise a relieved area, a peripheral groove or some other tactile discontinuity as shown at 36. The peripheral margin 36 preferably includes a plurality of spaced apart screw receiving holes 38 to facilitate the connection of the camera back 10 to the front camera body 11 in a manner to be subsequently described.

The film receiving chamber 32 may receive through the open end thereof at 40 a film container or cassette 42 holding a plurality of self-developing film units 44 arranged in stacked relation therein. For simplicity, the film units 44 are shown to include two sheet like elements 46 and 48 which are arranged in superposed relation, and a rupturable container 50 holding a supply of fluid processing composition 52, attached to one end of sheetlike elements 46 and 48. In reality, the film units 44 are multilayered structures which include one or more photosensitive and image receiving layers sandwiched between a tough transparent outer sheet (part of element 46) and an opaque bottom outer support sheet (part of element 48). A film unit 44 is exposed by transmitting light through the transparent outer sheet or "the exposure window". Subsequent to exposure, the rupturable container 50 is subjected to a compressible pressure thereby discharging the processing fluid 52 between a predetermined pair of adjacent layers to initiate a development and diffusion transfer process. When the resultant positive image is formed, it is viewed through the same transparent top outer sheet which served as the exposure window.

The film unit 44 may be exposed and processed without having to superpose and/or separate individual sheetlike elements and it is referred to as an "integral type" self-developing film unit. It will be understood that the illustrated sheetlike elements 46 and 48 have been used to diagrammatically show a boundary separating the predetermined layers between which the processing fluid 52 is distributed.

Since film unit 44 forms no part of the instant invention, it will not be described in further detail herein. Film unit 44 is intended to represent a general class of "integral type" self-developing film units of which there are many species. For detailed descriptions of some of the various species, reference may be had to U.S. Pat. No. 3,415,644 issued to E. H. Land on Dec. 10, 1968 and U.S. Pat. No. 3,594,165 issued to H. G. Rogers on July 20, 1971.

The film cassette 42 includes a forward wall having an exposure aperture 56 therein which is coextensive with the exposure window of the film unit 44. After the forwardmost film unit in container 42 has been exposed by light transmitted through the aperture 56, it is advanced forwardly (to the right as shown in FIGS. 2 and 5) through a film unit withdrawal slot 58 in a leading end wall 60 of container 42 and into the bite of a pair of juxtaposed cylindrical pressure-applying processing rollers 62 and 64. As the film unit 44 is further advanced between rollers 62 and 64, they apply a compressive pressure which ruptures fluid container 50 thereby discharging the processing fluid 52 between the predetermined layers of the film unit.

The film receiving chamber also includes means for locating the film cassette 42 therein comprising a pair of spaced apart, tapered guide rails 65, 67 extending outward from the rear wall element 24 toward the forward wall element 22 of the housing 12 for engaging the film cassette 42 upon the insertion of the film cassette into the open end 40 of the film receiving chamber 32. The guide rails thereafter operate to guide and station the film cassette 42 in operable position within the film receiving chamber 32 so that the forwardmost film unit 44 of the cassette lies adjacent the exposure window 34.

As best shown in FIGS. 2 and 3, a mounting apparatus for accurately locating and releasably retaining the pressure applying rollers 62 and 64 comprises a mounting bracket 66 in pivotal connection with respect to a mounting frame member 68 on the housing 10 adjacent the open end of the film receiving chamber 32. The mounting bracket 66 is preferably of stamped metal construction and includes a generally planar, horizontal bottom member 70 and a pair of integrally formed lateral upright members 72 and 74 upstanding substantially perpendicular to the bottom member at the lateral ends thereof. Integrally formed with the upright members 72 and 74 and extending rearwardly therefrom are a pair of arcuate mounting flanges 76 and 78, respectively, each including a mounting hole 80 therein. Other structural features included on the mounting bracket 66 include means for coupling the mounting bracket to a substantially flat housing as shown generally at 82 in a manner as is more fully described in a copending application for U.S. Patent (Our Case No. 5314) filed June 6, 1975, in common assignment herewith. These coupling means (not shown) are included upon the mounting bracket 66 for cooperating with integrally molded structure (also not shown) formed upon interior surfaces of the housing 82 to secure the housing 82 to the mounting bracket 66 and thereby accurately locate the housing 82 thereon in operative relationship with respect to the housing 10.

The pressure applying rollers 62 and 64 are rotatably mounted between the inwardly facing sides of the lateral upright members 72 and 74 with their respective lateral ends mounted by suitable bearings (not shown) included within the upright members 72 and 74.

As best shown in FIG. 2, the mounting frame 68 includes a pair of laterally spaced apart depending legs 84 and 86, each of which includes an outwardly extending mounting pin 88 thereon adapted to extend through one of the mounting holes 80 included upon the arcuate flange surface 76 and 78 for pivotally mounting the bracket 66 thereon. The mounting frame 68 is described in additional detail in a copending application Ser. No. 554,778 entitled "Modular Constructed Sequencing System For Photographic Apparatus", filed Mar. 3, 1975, by Bruce K. Johnson and David E. Van Allen and is adapted to receive the mounting bracket 66 thereon for pivotal movement between positions blocking and unblocking the open end 40 of the film receiving chamber 32. When the mounting bracket 66 and associated pressure applying rollers 62 and 64 are pivotally moved to the blocking or closed position adjacent the open end 40 of the film receiving chamber 32, the latching member shown generally at 90 may be provided to maintain the bracket 66 in the closed position in a manner generally the same as described in a copending application of U.S. Ser. No. 502,161 entitled "Film Cassette Loading Door Latch and Interlock Switch For Photographic Apparatus" filed Aug. 30, 1974, for Andrew S. Ivester and James Marchese.

The side walls of a film container or cassette 42 to be inserted into the receiving chamber 32 are laterally spaced apart at a distance less than the distance between the inwardly facing sides of the depending legs 84, 86 of the frame 68 thereby permitting the film container 42 to be inserted into the film receiving chamber 32. Should it be necessary to remove the mounting bracket 66 from the frame 68, one of the arcuate flanges may be readily removed from its mounting upon its outwardly extended pin 88 by applying pressure to the flanges 76 and 78 for spreading the flanges apart and the opposing ends subsequently removed for detaching the mounting bracket 66 from the mounting frame 68. Due to the orientation of the pins 88 upon the depending legs 84, 86, the mounting bracket 66 may be removed and attached to the frame 68 without disturbing an inserted film container located within the receiving chamber 32. Thus, the mounting bracket 66 is readily attachable and detachable as an integral unit from the camera back apparatus 10. Furthermore, the pressure applying rollers 62 and 64 are keyed thereto in precise location adjacent the open end 40 of the film receiving chamber 32 to properly receive an exposed film unit as it is advanced from within the cassette to a position between the bite of the pressure applying rollers 62 and 64.

The housing 82 is generally parallelopiped in shape and may also be of integrally molded thin walled plastic construction comprising two substantially planar forward and rearward major wall elements 92 and 94 spaced a substantially short distance apart and maintained in substantially parallel relation by two spaced apart substantially planar and parallel side wall elements 96 and 98 connecting respective longitudinal edge portions thereof to define an imbibing chamber therein for receipt of the processed film units advanced through the rollers. As is readily apparent, side walls 96 and 98 are in respective coplanar alignment with side walls 26, 28, while rear wall 94 is pivoted into substantial coplanar alignment with rear wall 24 when housing 82 and its associated rollers 62, 64 assume the aforementioned closed position. In addition, when housing 82 is pivoted into the closed position, a portion of housing section 20 is located above housing 82 with housing section 20 extending along housing 82 in the direction of the open end as shown at 100.

Open end 100 may be closed by a light sealing end wall or door member 102 which may be disposed for pivotal movement with respect to the housing 82 about an axis substantially coplanar with respect to one of the side walls 96, 98 by a pair of oppositely extending pins 104 and 106 which may be snap fitted into corresponding mounting holes on the forward and rear walls 92, 94, respectively. Pivoting the door member 102 into the open position permits the removal of individual film units from the imbibing chamber and as is readily apparent, opposed finger access indentations 108 and 110 may be provided in respective edge portions of forward and rear wall elements 92 and 94 to accomodate the ease with which the individual film units may be grasped and removed from the imbibing chamber. In addition, as should be readily apparent, the imbibing chamber is of sufficient width to store, in stacked relation, all of the film units 44 advanced therein from the cassette 42.

As best shown in FIG. 5, housing 82 further includes a camming member 112 integrally molded with the forward wall 92 for defining a generally planar transverse inclined camming surface 114 which is generally coextensive with the length of the rollers 62, 64 and extends downwardly away from the exit side of the rollers 62, 64 towards the open end 100 of housing 82. Camming surface 114 extends through the emerging path of travel of a film unit such that a leading end of the film unit engages the camming surface 114 upon emerging from between pressure applying rollers 62, 64 thereby being deflected downwardly. This deflection induces a gentle bend having a relatively large radius of curvature in the film unit forwardly of processing rollers 62, 64 which provides a beneficial influence on the uniformity of the distribution of the processing fluid as disclosed and described in detail in a copending application for U.S. Ser. No. 554,780 filed Mar. 3, 1975 for Andrew S. Ivester.

The above described imbibing chamber is provided to accomodate the processing of film units such as a transparency type which generally comprise a positive image superposed on a transparent or translucent support and may be either directly viewed by transmitting light through the transparency to the eye of an observer or indirectly viewed by transmitting light through the transparency for projection on a screen. Transparency type film units differ from conventional film units in that once the processing composition has been spread, sufficient imbibing time must be allowed in a light tight environment in order to complete the silver diffusion transfer process by which a positive image is formed on the image receiving component. Thus, the imbibing chamber provided by the housing 82 is made light tight when it is pivoted into the closed position with respect to the housing 12 as a result of the complementary edged portions between the housings 12 and 82 which engage in light tight sealing relation with respect to each other. In addition, as is readily apparent, the door member 102 must also have been pivoted into the light tight closed position in order to provide the aforementioned light tight environment for the imbibing chamber.

Referring now to FIGS. 2 and 3, there is shown in substantial detail a reciprocating film advance mechanism 116 for advancing the forwardmost film unit 44 in the film container 42 from the exposure position, through the film withdrawal slot 58 and into the bite of the processing rollers 62 and 64. The main portion of the film advancing mechanism 116 is preferably stamped from a thin sheet of metal such as stainless steel having a center support section 118 together with a first pick member 120 extending rearwardly therefrom together with a second pick member 122 extending rearwardly therefrom in generally parallel relation with respect to the first pick member 120. The first pick member 120 includes a trailing hook end 124 for engaging a trailing end of the forwardmost film unit 44. As the film advancing mechanism 116 is advanced forwardly, by means to be described hereinafter, the trailing hook end 124 pulls on the trailing end of the film unit 44 to advance it through the withdrawal slot 58 and into the bite of rollers 62 and 64. Access for the film engaging hook is provided by an elongated slot (not shown) at a trailing end corner of the film container 42.

The center support section 118 of the film advancing mechanism 116 is connected for reciprocal translation along a locus of travel generally orthogonal to the center axis of the rollers 62, 64 and parallel to the plane of the exposure window 34 through an integral molded mounting flange 126 extending laterally outward from the forward major wall element 22 toward the rearward wall element 24 in spaced parallel relation with respect to the exposure window 34. The center support section 118 includes two spaced apart elongated parallel slots 128 and 130 which slidingly engage respective pin members 132 and 134 extending laterally outward of the mounting flange 126. At the free forward end of the center support section 118, there is provided a right angle bend defining an end flange 136 configured to follow a pin member 138 extending laterally outward from a drive gear member 140. There is additionally provided a tension spring 142, one end of which connects directly to the film advancing mechanism 116, and the other end is grounded with respect to the housing 12. As will be described in detail hereinafter, the pin member 138 and drive gear 140 together with biasing tension spring 142 cooperatively determine the reciprocal translation of the film advancing mechanism 116 with respect to the mounting flange 126 in response to the actuatioon of an electrical motor 144.

Drive power for the camera back 10 is provided by the electrical motor 144 which may be powered from an electrical battery 146 at the bottom of the film container 42 through a pair of resilient contacts or terminal elements 148 and 150. Motor 144 is preferably a high speed motor which is intended to operate at a nominal speed of 12,000 rpm when connected to a dc voltage supply of approximately six volts. Electrical motor 146 is connected in operative driving relationship to the drive gear 140 by coupling means comprising a gear train shown generally at 152 comprising a plurality of intermeshed gear members 154. The individual gear members 154, in turn, are rotatably connected to a mounting bracket 156 which extends laterally outward from fixed connection with respect to the forward wall element 22. Rollers 62, 64 also include a gear member 155 mounted in driving connection therewith between upright members 72, 74 of mounting bracket 66 for meshed engagement with select gears of the gear train 152 upon pivotal movement of housing 82 into the closed position.

The electrical motor 144 is fixedly stationed in housing section 20 in lateral spaced apart relationship with respect to the pressure applying processing rollers 62 and 64 when the rollers are pivoted into position adjacent the open end 40 of film receiving chamber 32. More specifically, housing section 20 comprises an integrally molded, substantially planar, wall element 158 extending laterally outward at right angles from the edge portion of forward wall element 22 on the side of marginal section 36 opposite the exposure window 34. Extending obliquely outward from the longitudinal edge portion of wall element 158, there is provided another integrally molded, substantially planar, wall element 160, the outside longitudinal edge of which integrally connects to still another molded, substantially planar, wall element 162 extending obliquely outward from wall element 160 in substantially parallel relation with respect to the forward wall element 22. Still another wall element 163 may extend down from the wall 160 in substantially parallel relation with respect to end wall 30. A pair of spaced apart, substantially planar, and parallel, end wall elements 164 and 166 extend from respective integral coplanar connection with the side wall elements 26 and 28 into connection with respective edge portions of the wall elements 158, 160, 162 and 163 to cooperatively define the housing section as shown generally at 20. Thus, housing section 20 extends outwardly from the forward wall 22 of housing 12 in the direction away from rear wall 24 as well as a predetermined distance in front of the open end 40 in a direction away from end wall 30.

Referring now to FIGS. 3 and 6, it can be seen that motor 144 includes a generally parallelopiped shaped main housing having slightly curved side walls 168. Extending forwardly and rearwardly from opposed ends of the motor housng are cylindrical bearings 170, 172 for rotatably supporting the motor drive shaft 174. The motor is thus fixedly disposed in substantial juxtaposition with respect to the wall elements 158 and 160 between a pair of spaced apart, integrally molded, motor mounting arms 176 and 178 which extend outwardly from the wall elements 158 and 160. The motor mounting arms 176 and 178 define concave surfaces which respectively complement the cylindrical bearings 170 and 172. In addition, a pair of resilient metal clips 180 and 182, in respective fixed connection to the motor mounting arms 176, 178, have complementary concave surfaces which respectively engage the cylindrical bearings 170, 172 thereby fixedly maintaining the cylindrical bearings in fixed connection within their respective mounting arms. A gear 184 may be press-fitted onto the shaft 174 and serves as the first gear in the gear train 152.

In addition to the gear train and film advancing mechanism, there is also included a film counting wheel 186 having indicia thereon for visually indicating through a window 187 in end wall element 30 to the user how many film units 44 are left in the film container 42. In a preferred embodiment, film container 42 includes 10 film units 44 and a covering dark slide for preventing exposure of the forwardmost film unit prior to insertion of the film container 42 in the film receiving chamber 32. As will be described hereinafter, the camera back 10 is adapted to eject the dark slide in the same manner as a film unit 44. After a dark slide ejection, the wheel indicates the numeral 10 through the window and descends one digit per advancement in processing cycle of operation to the numeral 1.

The film counting wheel 186 includes two integrally formed ratchet wheels 188 and 190 on opposed sides thereof together with a center shaft 192 extending outwardly from opposed sides of the ratchet wheels 188 and 190. The center shaft 192 is disposed for rotation at the opposed ends thereof in spaced apart relation with respect to the forward wall element 22 by a pair of spaced apart stanchions 194 and 196 extending laterally outwardly from integral connection with respect to the forward wall element 22. A helical torsion spring 198, having one end grounded with respect to the housing 10, is provided to rotate the film counting wheel 186, together with its associated ratchet wheel 188 and 190, in a counterclockwise direction as viewed FIG. 3.

Ratchet wheel 188 is operatively associated with a pawl member 200 rotatively pinned to stanchion 194. The pawl member 200 is biased for rotation in a clockwise direction by a helical torsion spring 202, one end of which is grounded with respect to the housing 10, such that clockwise rotation to the pawl member 200 operates to rotate the free end thereof at 204 into the film receiving chamber 32. Thus, a film container 42 inserted within the receiving chamber 32 will operate to engage the free end 204 of the pawl member 200 and to rotate the pawl member in a counterclockwise direction thereby bringing the hooked end 206 thereof into engagement with the teeth of the ratchet wheel 188. As is readily apparent from the drawing, engagement of the hooked end 206 of the pawl member 200 with ratchet wheel 188 operates to restrict counterclockwise rotation of the ratchet wheel 188 while allowing clockwise rotation. The second pick member 122 which is operatively associated with the film advancing mechanism 116 in the previously described manner includes a trailing hook end 208 for engaging the teeth of ratchet wheel 190 during film advancement as to be subsequently described herein. Pick member 122 defines two, spaced apart, raised cam follower portions 210 and 212 arranged for sliding engagement with a cam surface 214 defined at the outside end of a projecting member 216 integrally molded with respect to the forward wall element 22 and extending laterally outward therefrom in the direction of the rear wall element 24. Thus, operation of the film advancing mechanism 116 to advance the forwardmost film unit 44 into the bite of the pressure applying processing rollers operates to simultantaneously translate the pick member 122 from its retracted position as shown in FIG. 3 where cam follower portion 212 is engaged by cam surface 214 to raise the trailing hook end 208 out of engagement with the teeth of ratchet wheel 190. Translation of pick member 122 toward the rollers 62 and 64 operates to slide cam follower portion 212 out of engagement with cam surface 214 allowing trailing hook end 208 to engage the teeth of ratchet wheel 190 and rotate the film counting wheel 186, thereby changing the indicia as may be viewed through the window 121 end wall element 30. Continued translation of pick member 122 operates to bring cam follower portion 210 into engagement with cam surface 214 thereby raising the trailing hook end 208 out of engagement with the teeth of ratchet wheel 190 so as to terminate the rotation of the counting wheel. In this manner, the spaced apart cam follower portions 210 and 212 operate to disengage the trailing hook end 208 of pick member 122 from the ratchet teeth in correspondence with engagement with the cam surface 214 thereby positively determining a select arcuate rotation of the counting wheel 186 without regard to either the configuration of the counting wheel 186, ratchet wheel 190 or pick member 122. As is now readily apparent, removal of the film cassette 42 upon exposure of all the film units 44 releases the free end 204 of the pawl member 200 so as to permit the pawl member 200 to rotate in a clockwise direction out of engagement with the teeth of ratchet wheel 188. With the ratchet wheel 188 disengaged, the counting wheel 186 is rotated in a counterclockwise direction to its initial position by the helical torsion spring 198.

Film advancement and processing by the camera back 10 in the aforementioned manner is initiated by means of a push button switch 218 fixedly stationed in the end wall 30 of housing section 18 for ready access from the outside thereof. Referring to the electrical schematic diagram of FIG. 10, it can be seen that the switch 218 is in series electrical connection between the battery 146 and the motor 144. The time required for film advancement and processing in the camera back 10, however, will likely exceed the human reaction time for depressing and releasing the pushbutton switch 218. Thus, there is also provided a second switch 222 in parallel connection with respect to the pushbutton switch 218 for energizing the motor 144 for a sufficient time to complete the film advancing and processing operations, and thereafter automatically disconnecting the motor 144 from the battery 146 in the following manner. Referring now to FIG. 4, the switch 222 includes a pair of spaced apart resilient leaf members 224, 226 extending outwardly therefrom in operative association with a profile cam 220 extending outwardly from the drive gear member 140 on the side opposite the pin 138. The resilient leaf member 224 includes a cam follower portion, shown generally at 228, which is drivingly engaged by the profile cam 220 subsequent to the initial actuation of the motor by the pushbutton switch 218. Thus, initial energization of the motor 144 by the pushbutton switch 218 is sufficient to rotate the profile cam 220 into engagement with the cam follower portion 228 so as to deflect the resilient leaf 224 into electrical connection with the resilient leaf 226, thereby continuing the electrical energization of the motor 144 regardless of the release of pushbutton switch 218. Upon completion of a single revolution of drive gear 140, which is sufficient to advance the film unit 44 through the processing rollers 62 and 64 as previously discussed, the profile cam thereafter drops off to allow the cam follower portion 228 and its associated resilient leaf 224 to spring out of contact with leaf member 226, thereby opening swtich 222 and deenergizing the motor 144.

To accommodate film cassettes of the type not including the battery 146, there may also be provided a second pair of electrical terminal elements embodied in a jack 229 to accommodate the convenient plugging therein of an outside power source (not shown). The electrical terminal elements from jack 229 are connected in parallel electrical connection with respect to the terminal elements 148 and 150 while the jack 229 is preferably mounted in fixed connection to the end wall 30 of housing section 18.

Figure 8:
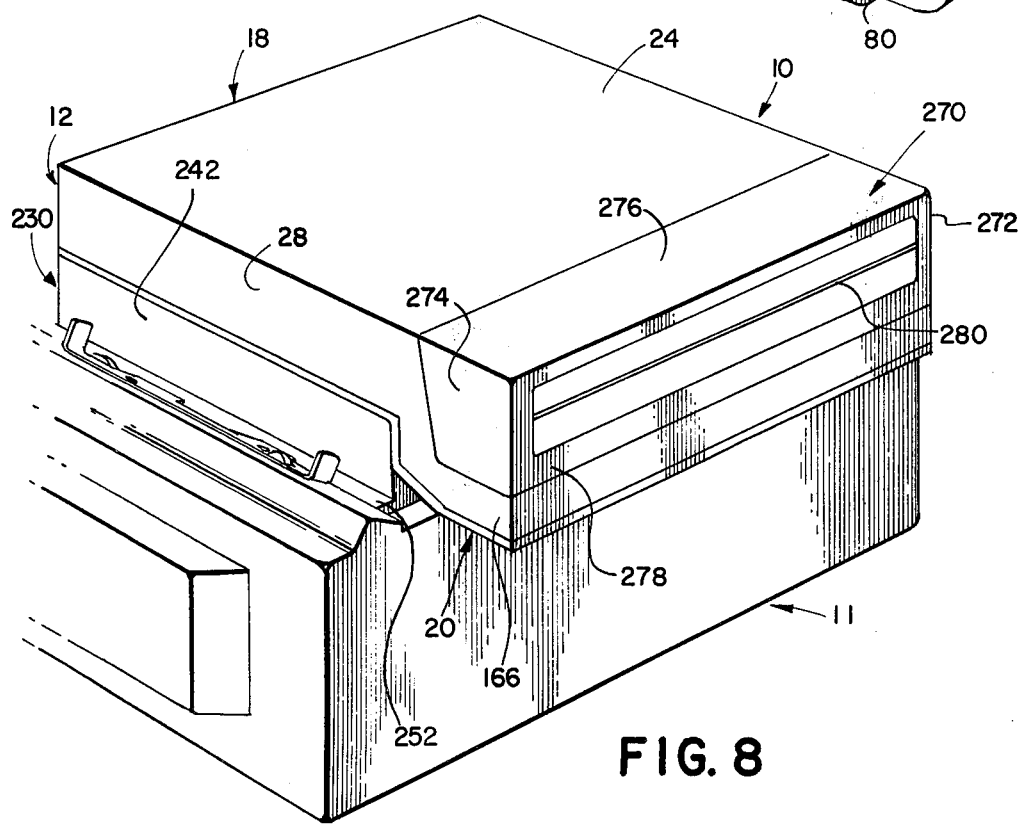
FIG. 8 is a perspective view of the camera back of FIG. 1 as mounted to a camera front by way of an adapter.
Figures 9, 11:
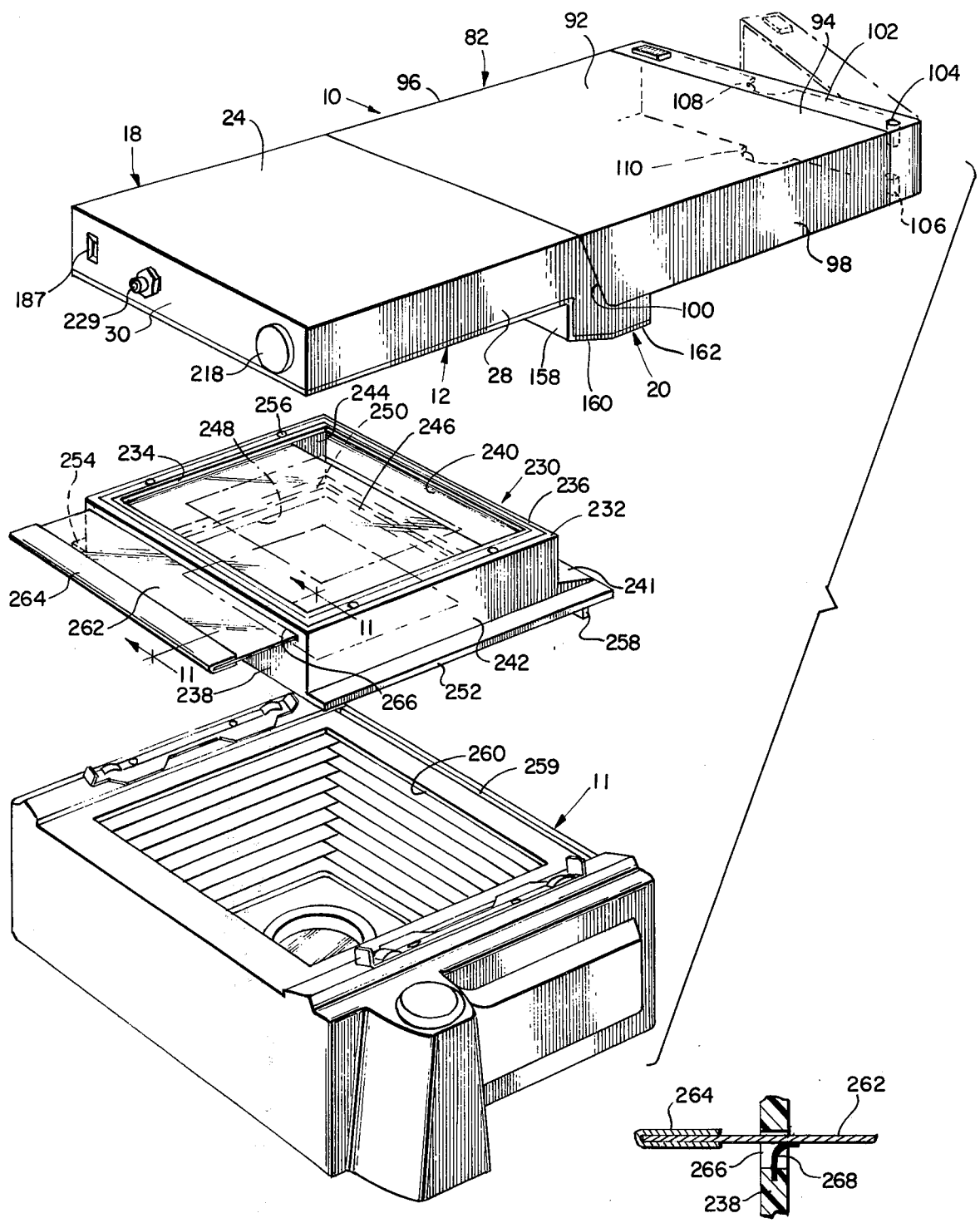
FIG. 9 is an exploded perspective of the camera front, adapter and camera back of FIG. 8.
FIG. 11 is a cross-sectional view taken across lines 11—11 of FIG. 9.

Referring now to FIGS. 8 and 9, there is shown an adapter at 230 for facilitating the releasable connection of the camera back 10 to the front camera body 11 in the following manner. Adapter 230 is of generally parallelopiped configuration comprisng a substantially planar, thin walled, molded rear wall member 232 having an exposure window 234 therein, and including a marginal section 236 around the exposure window 234. Marginal section 236 may also comprise a tactile discontinuity configured to complement a tactile discontinuity of the margin 36 to effect a light tight mating arrangement therewith when the adapter 230 is connected to the first housing 12. The adapter 230 further includes a pair of spaced apart end wall members 238, 240 and a pair of spaced apart, parallel, side wall members 242 and 244 together with a subtantially planar forward wall member 246 also having an exposure window 248 therethrough in alignment with exposure window 234. Exposure window 248 also includes a marginal section 250 therearound comprising tactile discontinuities extending around the exposure window 248 in the adapter's forward wall 246 to facilitate the releaseable light seal connection of the adapter 230 to the front camera body 11.

As is readily apparent, the adapter's end walls 238, 240 and side walls 242, 244 are configured to position the forward face of the adapter's forward wall 246 a distance from the forward wall element 22 of housing 12 equal to or greater than the distance that the housing section 20 extends outwardly from the forward wall 22 when the adapter is mated to the housing 12. Complementary screw holes (not shown) may be located on the rearward wall 232 for facilitating the releasable connection of the adapter to the first housing 12 in the aforementioned mating relationship. The adapter is preferably configured so that its side walls 242, 244 respectively present substantially coplanar extensions of the side walls 26, 28 and the end wall 238 presents a substantial coplanar extension of the end wall 30 when the adapter is connected to the housing 12. End wall 140 of the adapter includes an obliquely angled portion in juxtaposition with respect to the oblique wall element 160 above housing section 20 in interconnecting relation with respect to obliquely angled edge portions of the adapter side walls 242 and 244.

On that portion of the adapter 230 which extends above housing section 20, there is provided an outstanding rib 258 extending outward from the adapter forward wall 246 in substantially spaced apart parallel relation with an edge of the adapter forward wall exposure window 248 in order to facilitate the location of the forward and rearward adapter exposure windows 234, 248 relative to a framing aperture 260 in the front camera body 11 when the camera back 10 is connected to the front camera body. As is readily apparent, the outstanding rib 258 engages a corresponding slot 259 in the camera body 11 upon connection of the adapter 230 to the camera body.

A darkslide 262 having a gripping member 264 extending outward from one edge thereof may be provided for sliding engagement between the first housing 12 and the adapter 230 when the adapter is connected to the camera back. The darkslide 262 provides a light tight seal above the exposure window 34 and permits the camera back 10, when connected to the adapter 230, to be removed from the front camera body 11 without exposing the forwardmost film unit 44 in the film receiving chamber 32. Darkslide 262 may be slid into a slot or recess 266 in the adapter end wall member 238 and the slot 266 may include a resilient light seal 268, coextensive therewith, to maintain the light tight connection between the adapter 230 and camera back 10 upon removal of the darkslide 262. The resilient light seal 268 may comprise a felt coated, spring metal strip, one edge of which is fixedly connected to the slot 266.

Referring now to FIG. 8, there is shown an alternate embodiment for the camera back 10 wherein the elongated housing 82 has been replaced by a truncated housing 270 for use with ordinary film units of the nontransparency type which do not require an imbibing period subsequent to advancement through the processing rollers 62 and 64. Truncated housing 270 comprises a substantially planar rearward wall 276, a pair of parallel side walls 272 and 274 extending laterally outward from the opposed ends of the forward wall 276, and an end wall 278 connecting respective edge portions of the side walls 272, 274 and rear wall 276 to define a chamber when the housing 270 is disposed in its closed position. Truncated housing 270 connects to the mounting bracket 66 for pivotal movement with respect to the housing 12 in the aforementioned manner, so that once housing 270 assumes the closed position, end wall 278 aligns in substantially coplanar relation with the wall element 163 while the side walls 272, 274 and rear wall 276 substantially constitute the respective coplanar extensions of side walls 26, 28 and rear wall 24 of housing section 18.

Thus, as is now readily apparent, when the truncated housing 270 is in its closed position a portion of housing section 20 is located above the truncated housing 270 with the housing section 20 extending along the truncated housing 270 in the direction of the end wall 278. The truncated housing 270 additionally includes a film exit slot 280 disposed transversely within the end wall 278 through which an exposed and subsequently processed film unit may be advanced to the exterior of the camera back 10 subsequent to its passage between the processing rollers 62 and 64.

From the foregoing, it can be seen that there has been disclosed a compact packaging arrangement for a motorized camera back which may be utilized in combination with an imbibing chamber. Also, it should be readily appreciated that the camera back housing 12, which is arranged to define two distinct housing sections 18 and 20, may be manufactured from two thin walled, molded, body elements 14 and 16 fastened together in a simple manner. In addition, one of the body elements 14 serves as a main frame to which the majority of components such as the motor 144, film advance mechanism 116, counting wheel 186, etc. are operatively connected. In this manner, the various components may be easily connected to the main frame body element 14, after which the body elements 14 and 16 can be fixedly connected with respect to each other.

The invention may be practiced or embodied in still other ways without departing from the spirit and essential character thereof. A preferred embodiment described herein is therefore to be considered illustrative and not restrictive, the scope of the invention being indicated by the appended claims and all variations which come within the meaning are intended to be embraced therein.

What is claimed is:

1. A camera back for selective attachment to a front camera body, said camera back comprising:

a first housing including first and second fixedly connected sections, said first section including a substantially planar forward wall having an exposure aperture and including a marginal section comprising tactile discontinuities on its forward face extending around said exposure window configured to facilitate a releasable light sealed connection of said camera back to the front camera body, said first section additionally including a substantially planar rear wall spaced a substantially short distance from said forward wall in parallel relationship thereto by a pair of parallel side walls and an end wall, said first section defining a chamber having an open end opposite said end wall through which a film cassette including a plurity of unexposed film units of the self-developing type stacked in an array may be inserted into said chamber, said second section including a plurality of walls and extending outwardly from said forward wall of said first section in the direction away from its said rear wall and also extending a predetermined distance in front of said open end of said first housing in the direction away from its said end wall and further being disposed entirely on the opposite side of said marginal portion from said end wall so as not to extend over said marginal portion;

means within said first housing section for locating the cassette within said chamber with its stacked array of unexposed film units aligned with said exposure window;

an actuable film advance mechanism within said first housing for selectively initiating the advancement of a film unit after its exposure from the cassette in the direction of said first housing's open end;

a substantially flat second housing;

means for pivotally connecting said second housing to said first housing for displacement between a first position wherein said second housing precludes the insertion of the film cassette into, or its removal from, said chamber and a second position wherein access is available to said open end of said chamber for purposes of inserting and removing the film cassette from said chamber, said second housing including substantially planar forward and rear walls spaced a substantially short distance apart by a pair of parallel side walls and an end wall to define, when said second housing is disposed in its said first position, a chamber having an open end facing the first housing's open end substantially constituting extensions of said first housing's rear and side walls, said second housing's chamber extending a sufficient length in the direction away from its said open end to receive and store the film units after their exposure within said first housing, said short distance said second housing's forward wall is spaced from its said rear wall and said predetermined distanced said first housing's second section extends in front of its said open end serving, when said seond housing in its said first position, to locte a portion of said first housing's second section above a portion of said second housing with said first housing's second section extending only a relatively short distance along said second housing in the direction of said second housing's end wall;

a pair of juxtaposed processing rollers connected to said second housing adjacent its said open end for movement therewith to be located to receive therebetween a leading edge of an exposed film unit when said second housing is in its said first position and as the exposed film unit is advanced by said film advance mechanism from the cassette;

a motor positioned within said second section of said first housing so as not to interfere with said open end of said first housing's chamber;

means within said first housing for coupling said motor to said film advance mechanism;

means for automatically connecting at least one of said processing rollers to said coupling means when said second housing is displaced into its said first position from its said second position, whereby when said motor is energized said rollers cooperate with said film advance mechanism to advance the exposed film unit from said first housing and deposit the exposed and processed film unit in said second housing; and complementary means respectively formed on peripheral edges of appropriate ones of said walls of said first and second sections of said first housing and on peripheral edges of appropriate ones of said walls of said second housing to effect a light tight mating arrangement between said first and second housings when said second housing is disposed in its said first position and said camera back is connected to the front camera body whereby, at such time, said first and second housing sections serve to define a first chamber sealed from ambient light in which the film units can be retained prior to and during their exposure and a second chamber sealed from ambient light in which the film units may be stored following their exposure.

2. The invention of claim 1 additionally including an adapter comprising:

a substantially planar rearward wall having an exposure window and including a marginal section comprising tactile discontinuities on its rearward face extending around its exposure window and configured to complement said tactile discontinuities of said first housing's forward wall to effect a light tight mating therewith, said adapter further including a pair of spaced apart end walls, a pair of spaced apart parallel side walls, a substantially planar forward wall having an exposure window aligned with said exposure window of said adapter's rear wall and including a marginal section comprising tactile discontinuities on its forward face extending around said exposure window in said adapter's forward wall to facilitate a releaseable light sealed connection to the front camera body, said adapter's end walls and side walls being configured to position said forward face of said adapter's forward wall a distance from said first housing's forward wall equal to or greater than the distance said first housing's second section extends outward from said first housing's forward wall when said adapter is mated to said first housing; and complementary means respectively located on said first housing and said adapter for facilitating the releaseable connection of said adapter to said first housing in said mating relationship.

3. The invention of claim 2 wherein said adapter is configured so that its said side walls respectively present coplanar extensions of said first housing's side walls and one of its said end walls presents a coplanar extension of said first housing's end wall when said adapter is connected to said first housing in said mating relationship.

4. The invention of claim 3 wherein one of said adapter end walls extends above a portion of said first housing's second section and interconnects respective edge portions of said adapter side walls which also extend above said portion of said first housing's second section and wherein said adapter includes an outstanding rib extending outward from said adapter forward wall in a direction away from said adapter rearward wall in substantially spaced apart parallel relation with said adapter forward wall exposure window and above said portion of said first housing's second section when said adapter is mated to said first housing, to facilitate the location of the forward and rearward adapter exposure windows relative to a framing aperture in the front camera body when said camera back is connected to the front camera body.

5. The invention of claim 1 including means for accommodating the removal of processed film units from said second housing, said removal mans including a film exit opening at that end opposite said open end of said second housing chamber together with a door member in pivotal connection with respect to said film exit opening, said door being pivotally retained about an axis substantially coplanar with respect to one of said second housing sidewalls for movement between an open position and a closed position in light sealing engagement with said second housing, said film removal means additionally including opposed indentations in respective edge portions of said forward and rearward wall members to accommodate the grasping of individual film units in said second housing.

6. The invention of claim 1 including means for selectively connecting said motor to a source of electrical energy including: a first pair of electrical terminal element fixedly stationed in said first housing chamber for connection to a battery of the type housed together with the plurality of stacked self-developing film units in the film cassette, a manually actuable switch member in series electrical connection between said terminal elements and said motor, and a second pair of electrical terminal elements fixedly connected to said first housing in parallel electrical connection with respect to said first pair of electrical contacts to accommodate connection to a source of electrical energy outside of said camera back.

7. The invention of claim 6 wherein said means for connecting said motor to the source of electrical energy additionally includes: a resiliently biased open switch member in parallel connection with respect to said manually actuable switch and a profile cam disposed for rotation in correspondence with said coupling means, in engagement with said resiliently biased switch member so as to drive said resiliently biased switch into its closed condition subsequent to the manual actuation of said manually actuable switch member, said profile cam thereafter permitting said resiliently biased switch to assume its open condition upon completion of the advancement and processing of a film unit.

8. The invention of claim 1 wherein said film advance mechanism includes a picking member connected to said first section of said first housing for translation with respect thereto along a locus of travel generally orthogonal to the axes of said processing rollers and parallel to the plane of the exposure window wherein said picking member is also resiliently biased for translation away from said processing rollers, said coupling means operating to translatively move said picking member into engagement with the forwardmost one of said stacked film units so as to advance said forwardmost film unit into the bite of said rolles, said pick member including a flange portion extending orthogonal to said locus of travel and said coupling means including a gear member rotatably connected with respect to said first section of said first housing and having a projection extending laterally outward from a side thereof at a location spaced radially outward from the center axis thereof for driving engagement with said flange portion so that a single rotation of said gear member operates to bring said projection into sliding engagement with said flange portion to initially drive said flange portion and its associated picking member along said locus of travel toward said rollers against said resilient bias and to thereafter permit said resiliently biased picking means to retract along said locus of travel away from said rollers.

9. The invention of claim 1 wherein said means for locating the cassette within said first housing chamber includes a pair of spaced apart tapered guide rails extending outward from the rear wall toward the forward wall of said first housing for engaging the film cassette, upon insertion of the cassette into the open end of said first housing chamber, said guide rails thereafter operating to guide and station the cassette in operable position within said first housing chamber so that the outermost film unit of the cassette lies adjacent said exposure window.

10. The invention of claim 1 wherein said first housing comprises first and second molded, thin walled body elements having complementary edge portions in fixed connection with respect to each other to cooperatively define said first and second sections.

11. The invention of claim 1 including a film counting device comprising:
a counting wheel having indicia thereon for providing a visual indication from which the number of sequentially advanced film units may be determined;
means for rotatably connecting said counting wheel to the camera back;
ratchet means for rotatably driving said counting wheel and including at least one plurality of circumferentially spaced apart teeth therearound;
a pawl member;
means for pivotally connecting said pawl member to the photographic apparatus so that said pawl member is responsive to the receipt of the film cassette within said first housing chamber for pivoting into engagement with the teeth of said ratchet means to restrict rotation thereof in a predetermined direction;
means for resiliently biasing said pawl member to pivot out of engagement with said ratchet means teeth upon the withdrawal of the film cassette from said first housing chamber;
a cam surface in fixed connection with respect to said first housing;
a picking member operatively associated with said film advance mechanism for reciprocal translation therewith in opposing direction and included spaced apart cam follower portions thereof adapted for sliding engagement with said cam surface during said reciprocal translation, said picking member operating to engage said ratchet means teeth and rotate said ratchet means and its associated counting wheel in a direction opposite to that restricted by said pawl member when engaged with said ratchet means teeth upon translation of said picking member in one of said opposing directions, said spaced apart cam follower portions operating to disengage said picking member from said ratchet teeth upon engagement with said cam surface thereby positively determining a select arcuate rotation of said counting wheel without regard to either the configuration of the counting wheel and ratchet means or the distance of said reciprocal translation; and
means for automatically returning the counting wheel to its initial position subsequent to its rotation by said picking member and ratchet means in response to said pawl member disengaging from said ratchet teeth upon the withdrawal of the film cassette from said first housing chamber.

12. A camera back for selective attachment to a front camera body, said camera back comprising:
a first housing including first and second fixedly connected sections, said first section including a substantially planar forward wall having an exposure aperture and including a marginal section comprisng tactile discontinuities on its forward face extending around said exposure window configured to facilitate a releasable light sealed connection of said camera back to the front camera body, said first section additionally including a substantially planar rear wall spaced a substantially short distance from said forward wall in parallel relationship thereto by a pair of parallel side walls and an end wall, said first section defining a chamber having an open end opposite said end wall through which a film cassette including a plurality of unexposed film units of the self-developing type stacked in an array may be inserted into said chamber, said second section including a plurality of walls and extending outwardly from said forward wall of said first section in the direction away from its said rear wall and also extending a predetermined distance in front of said open end of said first housing in the direction away from its said end wall and further being disposed entirely on the opposite side of said marginal portion from said end wall so as not to extend over said marginal portion;
means within said first housing section for locating the cassette within said chamber with its stacked array of unexposed film units aligned with said exposure window;
an actuable film advance mechanism within said first housing for selectively initiating the advancement of a film unit after its exposure from the cassette in the direction of said first housing's open end;
a second housing;
means for pivotally connecting said second housing to said first housing for displacement between a first position wherein said second housing precludes the insertion of the film cassette into, or its removal from, said chamber and a second position wherein access is available to said open end of said chamber for purposes of inserting and removing the film cassette from said chamber, said second housing including a substantially planar rearward wall, a pair of parallel side walls extending laterally outward from opposed ends of said rearward wall and an end wall connecting said side walls at said predetermined distance in front of said open end of said first housing and including a film exit opening therethrough to define, when said second housing is disposed in its said first position, a chamber substantially constituting respective extensions of said first housing's rear and side walls, said second housing's chamber extending in the direction away from said open end of said first housing to receive the film units after their exposure within said first housing when said second housing is in its said first position, a portion of said first housing's second section being located above said second housing with said first housing's second section extending along said second housing in the direction of said second housing's end wall;

a pair of juxtaposed processing rollers connected to said second housing between its said side walls for movement therewith to be located to receive therebetween a leading edge of an exposed film unit when said second housing is in its said first position and as the exposed film unit is advanced by said film mechanism from the cassette;

a motor positioned within said second section of said first housing so as not to interfere with said open end of said first housing's chamber;

means within said first housing for coupling said motor to said film advance mechanism;

means for automatically connecting at least one of said processing rollers to said coupling means when said second housing is displaced into its said first position from its said second position, whereby when said motor is energized said rollers cooperate with said film advance mechanism to advance the exposed film unit from said first housing;

complementary means respectively formed on peripheral edges of appropriate ones of said walls of said first and second sections of said first housing and on peripheral edges of appropriate ones of said walls of said second housing to effect a light tight mating arrangement between said first and second housings when said second housing is disposed in its said first position and said camera back is connected to the front camera body whereby, at such time, said first housing section serves to define a first chamber sealed from ambient light in which the film units can be retained prior to and during their exposure; and an adapter including:

a substantially planar rearward wall having an exposure window and including a marginal section comprising tactile discontinuities on its rearward face extending around its exposure window and configured to complement said tactile discontinuities of said first housing's forward wall to effect a light tight mating therewith, said adapter further including a pair of spaced apart end walls, a pair of spaced apart coplanar side walls, a substantially planar forward wall having an exposure window aligned with said exposure window of said adapter's rear wall and including a marginal section comprising tactile discontinuities on its forward face extending around said exposure window in said adapter's forward wall to facilitate a releasable light sealed connection to the front camera body, said adapter's end walls and side walls being configured to position said forward face of said adapter's forward wall a distance from said first housing's forward wall equal to or greater than the distance said first housing's second section extends outwardly from said first housing's forward wall when said adapter is mated to said first housing; and complementary means respectively located on said first housing and said adapter for facilitating the releasable connection of said adapter to said first housing in said mating relationship.

13. The invention of claim 12 wherein said adapter is configured so that is said side walls respectively present coplanar extensions of said first housing's side walls and one of its said end wall when said adapter is connected to said first housing's end wall when said adapter is connected to said first housing in said mating relationship.

14. The invention of claim 13 wherein one of said adapter end walls extend above a portion of said first housing's second section and interconnects respective edge portions of said adapter side walls which also extend above said portion of said first housing's second section and wherein said adapter includes an outstanding rib extending outward from said adapter forward wall in a direction away from said adapter rearward wall in substantially spaced apart parallel relation with said adapter forward wall exposure window and above said portion of said first housing's second section when said adapter is mated to said first housing, to facilitate the location of the forward and rearward adapter exposure windows relative to a framing aperture in the front camera body when said camera back is connected to the front camera body.

15. The invention of claim 12 including means for selectively connecting said motor to a source of electrical energy including: a first pair of electrical terminal elements fixedly stationed in said first housing chamber for connection to a battery of the type housed together with the plurality of stacked self-developing film units in the film cassette, a manually actuable switch member in series electrical connection between said terminal elements and said motor, and a second pair of electrical terminal elements fixedly connected to said first housing in parallel electrical connection with respect to said first pair of electrical contacts to accommodate connection to a source of electrical energy outside of said camera back.

16. The invention of claim 15 wherein said means for connecting said motor to the source of electrical energy additionally includes: a resiliently biased open switch member in parallel electrical connection with respect to said manually actuable switch and a profile cam disposed for rotation in correspondence with said coupling means, in engagement with said resiliently biased switch member so as to drive said resiliently biased switch into its closed condition subsequent to the manual actuation of said manually actuable switch member, said profile cam thereafter permitting said resiliently biased switch to assume its open condition upon completion of the advancement and processing of a film unit.

17. The invention of claim 12 wherein said film advance mechanism includes a picking member connected to said first section of said first housing for translation with respect thereto along a locus of travel generally orthogonal to the axes of said processing rollers and parallel to the plane of the exposure window wherein said picking member is also resiliently biased for translation away from said processing rollers, said coupling means operating to translatively move said picking member into engagement with the forwardmost one of said stacked film units so as to advanced said forwardmost film unit into the bite of said rollers, said picking member including a flange portion extending orthogonal to said locus of travel and said coupling means including a gear member rotatably connected with respect to said first section of said first housing and having a projection extending laterally outward from a side thereof at a location spaced radially outward from the center axis thereof for driving engagement with said flange portion so that a single roation of said gear member operates to bring said projection into sliding engagement with said flange portion to initially drive said flange portion and its associated picking member along said locus of travel toward said rollers against said resilient bias and to thereafter permit said resiliently biased picking means to retract along said locus of travel away from said rollers.

18. The invention of claim 12 wherein said means for locating the cassette within said first housing chamber includes a pair of spaced apart tapered guide rails extending outward from the rear wall toward the forward wall of said first housing for engaging the film cassette, upon the insertion of the cassette into the open end of said first housing chamber, said guide rails thereafter operating to guide and station the cassette in operable position within said first housing chamber so that the outermost film unit of the cassette lies adjacent said exposure window.

19. The invention of claim 12 wherein said first housing comprises first and second molded thin walled body elements having complementary edge portions in fixed connection with respect to each other to cooperatively define said first and second sections.

20. the invention of claim 12 including a film counting device comprising:
- a counting wheel having indicia thereon for providing a visual indication from which the number of sequentially advanced film units may be determined;
- means for rotatably connecting said counting wheel to the camera back;
- ratchet means for rotatably driving said counting wheel and including at least one plurality of circumferentially spaced apart teeth therearound;
- a pawl member;
- means for pivotally connecting said pawl member to the photographic apparatus so that said pawl member is responsive to the receipt of the film cassette within said first housing chamber for pivoting into engagement with the teeth of said ratchet means to restrict rotation thereof in a predetermined direction;
- means for resiliently biasing said pawl member to pivot out of engagement with said ratchet means teeth upon the withdrawal of the film cassette from said first housing chamber;
- a cam surface in fixed connection with respect to said first housing;
- a picking member operatively associated with said film advance mechanism for reciprocal translation therewith in opposing directions and including spaced apart cam follower portions thereof adapted for sliding engagement with said cam surface during said reciprocal translation, said picking member operating to engage said ratchet means teeth and rotate said ratchet means and its associated counting wheel in a direction opposite to that restricted by said pawl member when engaged with said ratchet means teeth upon translation of said picking member in one of said opposing directions, said spaced apart cam follower portions operating to disengage said picking member from said ratchet teeth upon engagement with said cam surface thereby positively determining a select arcuate rotation of said counting wheel without regard to either the configuration of the counting wheel and ratchet means or the distance of said reciprocal translation; and
- means for automatically returning the counting wheel to its initial position subsequent to its rotation by said picking member and ratchet means in response to said pawl member disengaging from said ratchet teeth upon the withdrawal of the film cassette from said front housing chamber.

21. A camera back for selective attachment to a front camera body, said camera back comprising:
- a first housing comprising first and second body elements having complementary edge portions in fixed connection with respect to each other to cooperatively define first and second sections, said first section portion of said first body element including a substantially planar forward wall having an exposure aperture and including a marginal section comprising tactile discontinuities on its forward face extending around said exposure window configured to facilitate a releasable light sealed connection of said camera back to the front camera body, said first section portion of said second body element including a substantially planar rear wall spaced a substantially short distance from said forward wall in parallel relationship thereto by a pair of parallel side walls on said second body element and an end wall, said first section defining a chamber having an open end opposite said end wall through which a film cassette including a plurity of unexposed film units of the self-developing type stacked in an array may be inserted into said chamber, said second section portion of said first body element including a plurality of walls extending integrally outwardly from said forward wall of said first section in the direction away from its said rear wall and also extending a predetermined distance in front of said open end of said first housing in the direction away from its said end wall and further being disposed entirely on the opposite side of said marginal portion from said end wall so as not to extend over said marginal portion;
- means within said first housing section for locating the cassette within said chamber with its stacked array of unexposed film units aligned with said exposure window;
- an actuable film advance mechanism within said first housing section in operative connection to said first body element for selectively initiating the advancement of a film unit after its exposure from the cassette in the direction of said first housing's open end;
- a second housing;
- means for pivotally connecting said second housing to said first housing for displacement between a first position wherein said second housing precludes the insertion of the film cassette into, or its removal from, said chamber and a second position wherein access is available to said open end of said chamber for purposes of inserting and removing the film cassette from said chamber, said second housing including a substantially planar rearward wall, and a pair of parallel side walls extending laterally outward from opposite ends of said rearward wall and an end wall connecting said side walls at least at said predetermined distance in front of said open end of said first housing and including a film exit opening there thru to define, when said second housing is disposed in its said first position, a chamber substantially constituting respective extensions of said first housing's rear and side walls, said second housing's chamber extending in the direction away from said open end of said first housing to receive the film units, when said second housing is in its said first position, a portion of said first housing's second section being located above said second housing with said first housing's second section extending along said second housing in the direction of said second housing's end wall;

a pair of juxtaposed processing rollers connected to said second housing between its said sidewalls for movement therewith to be located to receive therebetween a leading edge of an exposed film unit when said second housing is in its said first position and as the exposed film unit is advanced by said film advance mechanism from the cassette;

a motor positioned within said second section of said first housing in fixed connection to said first body element so as not to interfere with said open end of said first housing's chamber;

means within said first housing section in operative connection to said first body element for coupling said motor to said film advance mechanism; and means for automatically connecting at least one of said processing rollers to said coupling means when said second housing is displaced into its said first position from its said second position, whereby when said motor is energized said rollers cooperate with said film advance mechanism to advance the exposed film unit from said first housing; and complementary means respectively formed on peripheral edges of appropriate ones of said walls of said first and second sections of said first housing and on peripheral edges of appropriate ones of said walls of said second housing to effect a light tight mating arrangement between said first and second housing when said housing is disposed in its said first position and said camera back is connected to the front camera body whereby, at such time, said first housing section serves to define a first chamber sealed from ambient light in which the film units can be retained prior to and during their exposure.

22. The invention of claim 21 additionally including an adapter comprising:

a substantially planar rearward wall having an exposure window and including a marginal section comprising tactile discontinuities on its rearward face extending around its exposure window and configured to complement said tactile discontinuities of said first housing's forward wall to effect a light tight mating therewith, said adapter further including a pair of spaced apart end walls, a pair of spaced apart parallel side walls, a substantially planar forward wall having an exposure window aligned with said exposure window of said adapter's rear wall and including a marginal section comprising tactile discontinuities on its forward face extending around said exposure window in said adapter's forward wall to facilitate a releasable light sealed connection to the front camera body, said adapter's end walls and side walls being configured to position said forward face of said adapter's forward wall a distance from said first housing's forward wall equal to or greater than the distance said first housing's second section extends outwardly from said first housing's forward wall when said adapter is mated to said first housing; and complementary means respectively located on said first housing and said adapter for facilitating the releasable connection of said adapter to said first housing in said mating relationship.

23. The invention of claim 22 wherein said adapter is configured so that its said side walls respectively present coplanar extensions of said first housing's side walls and one of its said end walls presents a coplanar extension of said first housing's end wall when said adapter is connected to said first housing in said mating relationship.

24. The invention of claim 23 wherein one of said adapter end walls extend above a portion of said first housing's second section and interconnects respective edge portions of said adapter side walls which also extend above said portion of said first housing's second section and wherein said adapter includes an outstanding rib extending out from said adapter forward wall in a direction away from said adapter rearward wall in substantially spaced apart parallel relation with said adapter forward wall exposure window and above said portion of said first housing's second section when said adapter is mated to said first housing, to facilitate the location of the forward and rearward adapter exposure windows relative to a framing aperture in the front camera body when said camera back is connected to the front camera body.

25. The invention of claim 21 including means for selectively connecting said motor to source of electrical energy including: a first pair of electrical termianl elements fixedly stationed in said first housing chamber for connection to a battery of the type housed together with the plurality of stacked self-developing film units in the film cassette, a manually actuable switch member in series electrical connection between said terminal elements and said motor, and a second pair of electrical terminal elements fixedly connected to said first housing in in parallel electrical connection with respect to said first pair of electrical contacts to accommodate connection to a source of electrical energy outside of said camera pack.

26. The invention of claim 25 wherein said means for connecting said motor to the source of electrical energy additionally includes:

a resiliently biased open switch member in parallel electrical connection with respect to said manually actuable switch and a profile cam disposed for rotation in correspondence with said coupling means, in engagement with said resiliently biased switch member so as to drive said resiliently biased switch into its closed condition subsequent to the manual actuation of said manually actuable switch member, said profile cam thereafter permitting said resiliently biased switch to assume its open condition upon completion of the advancement and processing of a film unit.

27. The invention of claim 21 wherein said film advance mechanism includes a picking member connected to said first section of said first housing for translation with respect thereto along a locus of travel generally orthogonal to the axes of said processing rollers and parallel to the plane of the exposure window wherein said picking member is also resiliently biased for translation away from said procesing rollers, said coupling means operating to translatively move said picking member into engagement with the forward one of said stacked film units so as to advance said forwardmost film unit into the bite of said rollers, said pick member including a flange portion extending orthogonal to said locus of travel and said coupling means including a gear member rotatably connected with respect to said first section of said front housing and having a projection extending laterally outward from a side thereof at a location spaced radially outward from the center axis thereof for driving engagement with said flange portion so that a single rotation of said gear member operates to bring said projection into sliding engagement with said flange portion to initially drive said flange portion and its associated picking member along said locus of travel toward said rollers against said resilient bias and to thereafter permit said resiliently biased picking means to retract along said locus of travel away from said rollers.

28. The invention of claim 21 wherein said means for locating the cassette within said first housing chamber includes a pair of spaced apart tapered guide rails extending outward from the rear wall toward the forward wall of said first housing for engaging the film cassette, upon the insertion of the cassette into the open end of said first housing chamber, said guide rails thereafter operating to guide and station the cassette in operable position within said first housing chamber so that the outermost film unit of the cassette lies adjacent said exposure window.

29. The invention of claim 21 including a counting wheel having indicia thereon for providing a visual indication from which the number of sequentially advanced film units may be determined;

means for rotatably connecting said counting wheel to the camera back;

ratchet means for rotatably driving said counting wheel and including at least one plurality of circumferentially spaced apart teeth therearound;

a pawl member;

means for pivotally connecting said pawl member to the photographic apparatus so that said pawl member is responsive to the receipt of the film cassette within said first housing chamber, for pivoting into engagement with the teeth of said ratchet means to restrict rotation thereof in a predetermined direction;

means for resiliently biasing said pawl member to pivot out of engagement with said ratchet means teeth upon the withdrawal of the film cassett from said first housing chamber;

a cam surface in fixed connection with respect to said first housing;

a picking member operatively associated with said film advance mechanism for reciprocal translation therewith in opposing directions and including spaced apart cam follower portions thereof adapted for sliding engagement with said cam surface during said reciprocal translation, said picking member operating to engage said ratchet means teeth and rotate said ratchet means and its associated counting wheel in a direction opposite to that restricted by said pawl member when engaged with said ratchet means teeth upon translation of said picking member in one of said opposing directions, said spaced apart cam follower portions operating to disengage said picking member from said ratchet teeth upon engagement with said cam surface thereby positively determining a select arcuate rotation of said counting wheel without regard to either the configuration of the counting wheel and ratchet means or the distance of said reciprocal translation; and means for automatically returning the counting wheel to its initial position subsequent to its rotation by said picking member and ratchet means in response to said pawl member disengaging from said ratchet teeth upon the withdrawal of the film cassette from said first housing chamber.

* * * * *